United States Patent Office 3,562,081
Patented Feb. 9, 1971

3,562,081
BINDER COMPOSITION COMPRISING AN AQUEOUS EPOXY EMULSION AND PROCESS OF MAKING GLASS FIBER PRODUCTS
Joseph P. Stalego, Newark, Ohio, assignor to Owens-Corning Fiberglas Corporation, a corporation of Delaware
No Drawing. Filed Feb. 15, 1968, Ser. No. 705,617
Int. Cl. B23b 5/28; C08g 30/04
U.S. Cl. 161—93
8 Claims

ABSTRACT OF THE DISCLOSURE

Glass fiber mats and laminated glass fiber products made from glass fiber mats wherein the glass fibers are bonded together at their points of contact with a binder composition applied as an aqueous emulsion composed of, as essential ingredients, an epoxy resin, an esterifying acid, a curing agent, a silane bonding aid and a solvent for the epoxy resin; and having a pH from about 7 to 8.5.

BACKGROUND OF THE INVENTION (1) Field of the invention

This invention relates to binder compositions suitable for use in the production of glass fiber mats, which are in turn used in the manufacture of laminated glass fiber products.

Laminated glass fiber products, and in particular laminated glass fiber sheets which have good electrical insulating properties are used, for example, as backers for breaker panels and in many other applications where good electrical properties are desirable. These laminated products are generally made by first forming a mat of overlapping loops of glass fiber strands which are bonded together at their points of contact by a binder resin, then saturating the mat with another resin, forming a sandwich of mats, and thereafter curing the sandwich by the application of heat and pressure to form the laminated product. The laminate can be made in the form of a flat sheet, or molded or wound in the desired configuration. Alternately, the sandwich is formed, the saturating resin is applied, and the sandwich is then cured.

If desired, the laminate can be prepared from a single sheet of glass fiber mat which is saturated with laminating resin.

(2) The prior art

In the prior art a binder which consisted essentially of a phenol-formaldehyde type resin has been used in the manufacture of glass fiber mats which were ultimately made into laminated glass fiber sheets. This binder was unstable, had poor shelf life, and had a tendency to build up rapidly on a conveyor chain carrying the mat through an oven for cure, thus necessitating frequent shutdowns in order to clean the conveyor chain and associated machinery.

Another type of binder which has been used is one containing a water soluble amine modified epoxy resin. This type of binder is relatively expensive, requires a precook cycle, must be formulated to have a long pot life (stability), and the mat produced with the binder is brashy.

The binder composition of the invention is considerably less expensive than the epoxy resin based binders used heretofore, requires no precooking, and has minumum buildup on the conveyor chain carrying the mat through the oven for cure. The glass fiber mat produced is more flexible, has a better hand, and is less brashy than mats produced previously.

It is an object of this invention to provide a method of making laminated glass fiber products having desired electrical properties.

It is another object of this invention to provide laminated glass fiber products.

It is a further object of this invention to provide a new binder composition which is economical, requires no precooking and which reduces binder buildup on the oven conveyor chain and associated apparatus.

It is another object of this invention to provide a method of making a glass fiber mat which is particularly suited for use in the production of laminated glass fiber products having desired electrical properties.

It is a still further object of this invention to provide a glass fiber mat which is particularly suited for use in the production of laminated glass fiber products having desired electrical properties.

It is a still further object of this invention to provide a new binder composition which is useful in the production of glass fiber mats used in the production of laminated glass fiber products having desired electrical properties.

These and other objects will be more fully appreciated by reference to the following detailed explanation of the invention.

SUMMARY OF THE INVENTION

The binder composition of this invention comprises an aqueous emulsion of—

(1) From about 28 to 92 percent [1] of an epoxy resin selected from the group consisting of diglycidyl ethers of bisphenol-A and its homologs, glycidyl ethers of glycerol, glycidyl ethers of bisphenol-F, glycidyl ethers of tetrakis (hydroxyphenyl) ethane, peracid epoxies and epoxylated novolacs, (2) From about 7 to 42 percent of an esterifying acid selected from the group consisting of trimer acids, dimer acids, and fatty acids having a chain length ranging from about 8 to 20 carbon atoms, (3) From about 1 to 10 percent of a curing agent for said epoxy resin having a boiling point between about 150° F. and about 550° F., (4) From about ⅕ to 10 percent of silane bonding aid, (5) From about 3 to 65 percent of a solvent for said epoxy having a boiling point between about 150° F. and about 375° F., said binder having a pH above about 7, desirably in the range from 7 to 9.

The binder preferably contains, in addition, from about ⅕ to 4 percent of a silicone release and anti-foaming agent.

In the manufacturing the products of this invention the above described binder preferably is used, as described below, in conjunction with a size which comprises, on a dry basis, i.e., excluding water, an aqueous solution of:

from about 20 to 98 percent 3,5-dimethyl-1-hexyn-3-ol,
from about ½ to 40 percent iso-octyl-phenoxy-polyoxyethylene ethanol, and
from about 1 to 75 percent of an aminoalkylsilane.

The method of this invention comprises attenuating streams of molten glass into fibers, treating the glass fibers with a size, forming the fibers into strands, projecting the strands onto a conveyor to form a mat of overlapping loops of glass fiber strands, treating the mat with the above described binder composition, and curing the binder. Further steps to form a laminate include saturating the mat with another resin, forming a sandwich of a plurality of mats, and curing the second resin in ---
[1] The terms "percent" and "parts" are used herein and in the appended claims to refer to percent and parts by weight, unless otherwise indicated.

the sandwich by the application of heat and pressure to form a laminated glass fiber product.

Alternately, the process comprises forming a sandwich of a plurality of mats, and then applying the saturating resin to the sandwich, rather than to individual mats.

This invention will be more clearly understood by reference to the following examples, which are presented only to illustrate and disclose, and are not to be construed as limiting.

EXAMPLE I

Molten streams of glass were drawn from a multi-orifice bushing which formed part of a glass melting furnace and were attenuated into fibers. The glass fibers had an average diameter of approximately 58 hundred thousandths of an inch. The fibers were pulled over a plurality of rolls, approximately 364 fibers to each roll, whereby the individual fibers were formed into strands or bundles of fibers. As the fibers were being pulled over the rolls, a size was applied thereto from the rolls. The size consisted of (on a dry basis) 48.9 percent 3,5-dimethyl-1-hexyn-3-ol, 2.2 percent iso-octyl-phenoxy-polyoxyethylene ethanol, and 48.9 percent N-beta-(aminoethyl)-gamma-aminopropyltrimethoxy-silane, added as a 60 percent solution in methanol, all in a water solution at a 1.08 percent concentration of the size components in the water. The size was prepared by mixing with constant agitation the above listed ingredients.

After the size was applied, the strands were laid down in substantially random manner on a moving foraminous conveyor to form a porous mat. Thereafter the mat was passed into a bath where a binder forming a part of this invention was applied to the mat. The binder consisted of (on a dry basis) of an aqueous emulsion of:

| Ingredients | Percent |
| --- | --- |
| Di-isobutyl ketone | 28 |
| Diglycidyl ether of bisphenol-A having a Gardner color of 1, an epoxide equivalent of 173–179, an average molecular weight of 340–350, and a viscosity of 3500–6400 c.p.s., at 25° C. | 46 |
| Dimer acid, produced by the polymerization of unsaturated $C_{18}$ fatty acids | 16 |
| Triethylene tetramine | 3 |
| Ammonia | 6 |
| Dimethyl polysiloxane release agent | 3/10 |
| N-beta-(aminoethyl)-gamma - aminopropyltrimethoxysilane plus, an antifoaming agent as needed (Anti-Foam Q) | 7/10 |

The binder was prepared by first mixing the ketone, epoxy resin, dimer acid, triethylene tetramine and ammonia in the order listed under constant agitation. Warm water was then added in a sufficient quantity to form an emulsion. The temperature was raised to 130° F. and held there for one hour. Cold water was then added followed by the balance of the listed ingredients, with agitation. The water was added in a quantity sufficient to give a final solids content of about 20 percent.

After the binder was applied the continuous mat was passed into a curing oven and cured for approximately 3 minutes at a temperature of 410° F., thereby bonding the strands together at their points of contact. The porous cured mat weighed from ¾ oz. to 1¼ oz. per square foot and had approximately a 10 percent L.O.I. (loss on ignition: equal to binder content).

After cure the mat was saturated with an oil modified cresol-phenolic resin (Catalin No. 6635) which was cured to the "B" stage, and thereafter a sandwich was formed by laying a plurality of mats on top of each other. The sandwich was then cured in a press for approximately 20 minutes at 325° F. to form a laminated product. Thereafter the laminated product was cut into sheets of the desired shape and size. The sheets had an apparent specific gravity of 1.3 to 2.0.

In the size formulation set forth above, the 3,5-dimethyl-1-hexyn-3-ol serves to improve the wetting characteristics and decrease the surface tension of the size. The iso-octyl-phenoxy-polyoxyethylene ethanol also serves essentially the same function. The N-beta-(aminoethyl)-gamma-aminopropyltrimethoxysilane facilitates bonding of the subsequently applied binder to the glass fibers. It also improves the moisture resistance, and, to a degree, the electrical properties of the resin.

After extensive investigation it appears that the two wetting agents set forth above must be used to achieve the maximum electrical properties of the laminated product, although, if electrical properties are not critical, other wetting agents can be used. Other silanes can be substituted for the preferred N-beta-(aminoethyl)-gamma-aminopropyltrimethoxysilane used in the size.

It is preferred that the 3,5-dimethyl-1-hexyn-3-ol constituent constitute from about 20 to about 98 percent of the size, more preferably about 45 to about 50 percent and most desirably about 49 percent. It is also preferred that the iso-octyl-phenoxy-polyoxyethylene ethanol component constitute from about ½ to about 40 percent, more preferably about 1 to about 3 percent, and most desirably about 2 percent, and that the silane constitute from about 1 to about 75 percent, more preferably about 45 to about 50 percent and most desirably about 49 percent. The exact percentages are not critical, however. Preferably, the silane and 3,5-dimethyl-1-hexyn-3-ol are present in major proportions, and the iso-octyl-phenoxy-polyoxyethylene ethanol is present in a minor proportion.

In making up the size the components are dissolved in water. They can be present in concentrations ranging from as low as ¼ percent solids to 3 percent solids by weight or higher in the water. Preferably, the size has a concentration of from about ¾ percent to about 1½ percent solids.

The chief components of the binder composition of this invention are the epoxy resin and the esterifying acid.

The preferred epoxy resin for use in the binder composition of the invention is sold under the trade name D.E.R. 332. This resin is produced by the reaction of epichlorohydrin and bisphenol-A, and is a diglycidal ether having the approximate chemical structure

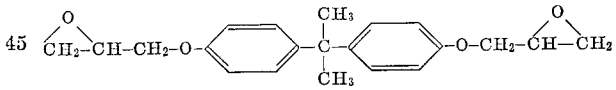

Typical properties of this resin are as follows:

Color (Gardner)—1 maximum
Viscosity (centipoise)—6400 maximum
Epoxide equivalent weight—179 maximum
Volatile content (percent by wt.)—0.5 maximum
Total chlorides (Parr bomb)—0.249
Specific gravity—1.16
Lbs./gal.—9.7

This specific resin is preferred for use in the binder of the invention because of its low color, and lack of impurities which allows the production of a laminate having good electrical properties. Other epoxy resins can be used in place of D.E.R. 332, however.

In general, any of the glycidyl ethers of glycerol, glycidyl ethers of bisphenol-F, glycidyl ethers of tetrakis (hydroxy phenyl) ethane, peracid epoxies, and epoxylated novolacs can be used. These types of resins are well-known to those skilled in the art and are described in the book "Epoxy Resins," by Lee and Neville, McGraw-Hill (1957).

In general, however, it is preferred that the epoxy resin be liquid, and have a viscosity from about 2000 to 7000 centipoises.

Some epoxy resins contain bromine or other halogens, either as part of the resin or as impurities. Resins containing more than trace amounts of halogens are undesirable as they affect the electrical properties of the finished product. If the electrical properties are not a factor, then this consideration does not apply.

Suitably epoxy resins for use in the practice of this invention are sold by General Mills, Inc. under the trade names GenEpoxy 175, and GenEpoxy 175–LC; by the Celanese Chemical Company under the trade names Epi-Rez 508, and Epi-Rez 50810; by the Ciba Products Company under the trade name Araldite 6004 (all of which are diglycidyl ethers of bisphenol-A); by the Dow Chemical Company under the designations D.E.R. 330, D.E.R. 331, D.E.R. 334, D.E.R. 661, and D.E.R. 662 (also diglycidyl ethers of bisphenol-A), and D.E.N. 438, and 439 (epoxy novolacs); by the Union Carbide Corporation under the designation E.R.L.A. 4221 (a peracid epoxy, epoxy cyclohexyl methyl epoxy cyclohexane carboxylate).

Various properties of some of the above-mentioned resins are set forth in Table I:

TABLE I

| Resin: | E.E.W.[1] | Viscosity | Color[2] |
|---|---|---|---|
| D.E.R. 330 | 182–189 | [3] 7,000–10,000 | 3 |
| D.E.N. 438 | 176–181 | [3] 35,000–70,000 | 2 |
| D.E.N. 439 | 191–210 | [3] 4,000–10,000 | 3 |
| D.E.R. 661 | 475–575 | [4] G–J | 1 |
| D.E.R. 662 | 575–700 | [4] H–L | 1 |
| E.R.L.A. 4221 | 145 | [3] 2,000 |  |
| Epi-Rez 508 | 171–175 | [3] 3,600–5,500 | 1 |

[1] Epoxide equivalent weight.
[2] Gardner.
[3] Cps. at 25° C.
[4] Gardner-Holdt at 40 percent non-volatile content in Dowanol DB at 25° C.

Typical properties of D.E.R. 331, and D.E.R. 334 are as follows:

D.E.R. 331:
    Color (Gardner)—5 maximum
    Viscosity (centipoise)—11,000–16,000
    Epoxide equivalent weight—187–193
    Volatile content (percent by weight)—0.5 maximum
    Total chlorides (Parr bomb)—0.249
    Specific gravity—1.17
    Lbs./gal.—9.8

D.E.R. 334:
    Color (Gardner)—5 maximum
    Viscosity (centipoise)—500–700
    Epoxide equivalent weight—178–186
    Total chlorides (Parr bomb)—0.349
    Percent butyl glycidy ether—10.5–11.5
    Specific gravity—1.13
    Lbs./gal.—9.4

The above listed resins are only illustrative of the many which can be used, and it is not intended that the list be limitative. The specific identity of the resin is not critical, except that, if the binder is used to make electrical products the resin should be substantially free of halogens, e.g., should contain not more than about ½ percent.

The epoxy resin serves as the major and primary bonding constituent in the binder formulation. As previously stated it can be present in an amount ranging from about 28 to 92 percent. It is preferably present in an amount ranging from about 40 to about 50 percent, and most desirably about 46 percent.

The esterifying acid, the second major component of the binder composition, reacts with the epoxy resin in situ to form an ester thereof and to become a part of the cured resin binder film. It imparts a greater degree of flexibility and toughness to the cured resin film, and gives a better hand and superior feel to the mat product. In addition, it functions as a release agent to prevent binder build-up on the oven conveyor chain and associated apparatus.

The preferred esterifying acid which can be used in the practice of this invention is a dimer acid prepared by the polymerization of $C_{18}$ fatty acids. It can be obtained under the trade name Empol 1022 Dimer Acid, and is made by the Emery Chemical Company, Cincinnati, Ohio. Other grades of dimer acids which can be used can be obtained under the trade names Empol 1014, Empol 1018, and Empol 1024. Specifications for these dimer acids are set forth in Table II.

TABLE II

|  | Empol 1014 | Empol 1018 | Empol 1022 | Empol 1024 |
|---|---|---|---|---|
| Neutralization equivalent | 188–294 | 287–299 | 289–301 | 289–301 |
| Acid value | 191–195 | 188–196 | 186–194 | 186–194 |
| Saponification value | 195–199 | 192–198 | 191–199 | 191–199 |
| Color, Gardner 1953, maximum | 8 | 8 | 9 | 9 |
| Monobasic acids, percent maximum | 1.5 | 1 | 2–5 | 1 |

Other dimer acids can be used as, for example those prepared by the polymerization of unsaturated $C_8$ to $C_{16}$ fatty acids.

Still other acids which are operable include trimer acids and unsaturated fatty acids.

A trimer acid which can be used in this invention is prepared by the polymerization of unsaturated $C_{18}$ fatty acids. It can be obtained under the trade name Empol 1043 Trimer Acid, and is made by the Emery Chemical Company, Cincinnati, Ohio. Empol 1043 Trimer Acid is essentially a mixture of tribasic and dibasic acids containing approximately 75–80 percent tribasic acid. The structure of this trimer acid may be represented schematically as shown below. The structure includes three or more side chains represented as $R_1$, $R_2$ and $R_3$. Within the molecule, at X, are undetermined linkages formed during the polymerization of the three unsaturated fatty acid molecules that form trimer acid.

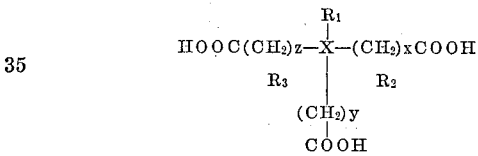

Tentative specifications and typical characteristics for Empol 1043 are listed in Table III:

TABLE III.—TENTATIVE SPECIFICATIONS AND TYPICAL CHARACTERISTICS

| Property | Tentative specification | Typical characteristics | Test method |
|---|---|---|---|
| Acid value | 188–196 |  | ASTM D 1980–61 |
| Saponification value | 195–205 |  | ASTM D 1962–61 |
| Color, Gardner maximum | 9 |  | ASTM D 1544–63T |
| Iodine value |  | 100 | ASTM D 1959–61 |
| Viscosity, cs. at 210° F |  | 220 | ASTM D 445–65 |
| Unsaponifiable, percent |  | 0.5 | ASTM D 1965–61 |
| Refractive index, 25° C |  | 1.4900 | ASTM D 1218–61 |

Other suitable trimer acids are those which are prepared by the polymerization of unsaturated fatty acids having carbon chain lengths ranging from about 8 to about 16.

Suitable fatty acids for use in the binder composition of the invention include linseed oil, tall oil, and dehydrated castor oil acids. The dehydrated castor oil acids are sold by the Baker Castor Oil Company under the trade names Baker DCO Acids 9–11, 150 and 145. Typical properties of these acids are set forth below in Table IV.

TABLE IV.—PROPERTIES

|  | Physical | | | Chemical | |
|---|---|---|---|---|---|
|  |  | Gardner | |  |  |
|  | Density (lb./gal.) | Color | Viscosity | Acid value | Iodine number | Saponification value |
| Acid: |  |  |  |  |  |  |
| 9–11 | 7.50 | 1 | A–1 | 194 | 154 | 198 |
| 150 | 7.53 | 1 | A | 197 | 153 | 198 |
| 145 | 7.55 | 7+ | A+ | 188 | 145 | 195 |

In general any unsaturated fatty acid, dimer acid or trimer acid can be used in the binder composition of the invention. The aforementioned dimer acids are preferred, however, because they have a minimal affect on the color of the finished product. The acid can be present in quantities ranging from about 7 to 42 percent, 16 percent being preferred.

A solvent for the epoxy resin is used in the binder composition of the invention. The solvent should be one in which the resin is soluble and which has a vapor pressure sufficiently high that there is no fire hazard during cure of the binder, but sufficiently low that the solvent volatilizes during curing. The solvent also serves as auxiliary cleaning function. In general the solvent should have a boiling point from about 150 to 375° F.

The preferred solvent for use in the practice of the invention is di-isobutyl ketone (B.P. about 334° F.). Other solvents which can be used include, for example, toluene, and methylisobutyl ketone. Aside from the above established criteria, the nature of the solvent is substantially immaterial.

The solvent must be present in sufficient quantity to dissolve the resin, and to form a resin solution having a sufficiently low viscosity to enable emulsification. Preferably, it is present in quantities ranging from about 3 to about 65 percent, and most desirably about 28 percent.

Another essential ingredient for the binder composition of this invention is a hardener or curing catalyst for the resin. The preferred catalyst is triethylene tetramine, although other aliphatic polyamines such as, for example, diethylene tetramine, and tetraethylene pentamine can be used. Other conventional catalysts such as the polyamides also can be used. The chief requirement of the catalyst is that it be able to set up quickly at elevated temperatures. Preferably it has a boiling point from about 150° F. to 550° F. In any event, it should vaporize below the curing temperature of the resin, so that a free amine residue is not left in the product after it is cured. Free amine in the product is detrimental to the later applied laminating resin. The catalyst preferably is present in the binder in an amount ranging from about 1 to about 10 percent, most preferably about 3 percent. In addition to the catalyst function, the amine serves as an emulsifying aid for the system.

Another essential ingredient of the binder system of this invention is a silane bonding aid. This agent is believed to serve the dual function of improving the bond between the resin binder and the glass surface and between the bonded mat and the subsequently applied saturating resin. It also gives moisture resistance and durability characteristics to the bonded mat.

Preferred silanes include aminoalkyl silanes and epoxy silanes.

The aminoalkylsilanes which are suitable for incorporation in the binder composition of the invention have the general formula, $R_n—Si—(—OR')_{(4-n)}$ wherein R is an aminoalkyl radical chemically bonded to the silicon atom, R' is an alkyl radical having from 1 to 4 carbon atoms, and $n$ is an integer from 1 to 3, inclusive. A preferred class of silanes represented by the foregoing formula is one wherein R has the formula $H_2N—R''$, and wherein R'' is an alkylene radical having from 2 to 6 carbon atoms. Optimum results have been achieved using N-beta-(aminoethyl)-gamma-aminopropyltrimethoxysilane. Another such preferred class is one wherein R has the formula $H_2N—R''—NH—R'''$, wherein R'' and R''' are both alkylene radicals having from 2 to 6 carbon atoms.

The epoxy silanes suitable for use as bonding aids include those of the formula

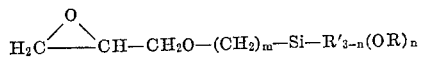

wherein each R and each R' is an aliphatic hydrocarbon radical of less than 4 carbon atoms, $m$ is an integer greater than 1 and less than 4, and $n$ is an integer greater than 1 and less than 4.

Preferred epoxy silanes include beta-(3,4 epoxycyclohexyl)-ethyl trimethoxysilane, and gammaglycidoxypropyltrimethoxysilane. Still other operable epoxy silanes are described in copending application Ser. No. 618,318.

Also suitable for use are epoxy functional siloxanes such as disiloxanes of the formula

and polymers of the formula

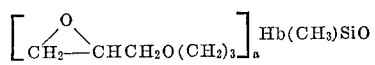

wherein R is an aliphtaic hydrocarbon radical of less than 4 carbon atoms, $m$ is an integer greater than 1 and less than 4, $x$ is selected from 0.1, and 2, $a$ is greater than 0 and not more than 0.5, and $b$ is at least 0.5 and less than 1.0.

The aminoalkylsilane or epoxy silane is added to a mixing tank along with the other ingredients at the time of formulating the binder composition. The amount of the aminoalkylsilane or epoxy silane added may range from about ⅕ to about 10 percent, preferably from about ⅖ to 6 percent, and most desirably, about 7/10 percent. When an aminoalkylsilane comes in contact with water, there is a tendency for at least partial hydrolysis to occur probably with the formation of a siloxane. It is to be understood that in the aqueous binder composition of the invention, both the aminoalkylsilane and its hydrolysis products are encompassed. Preferred silanes include gamma-amino-propyltriethoxysilane, and bis(beta-hydroxy ethyl)-gamma-aminopropyltriethoxy silane. The aminoalkylsilanes are also suitable for use in the size disclosed herein.

Ammonium hydroxide is used in order to adjust the pH of the binder composition to one of at least about 7, and to aid in the formation of the emulsion. Organic amines could be used to aid in forming the emulsion but are less desirable because they are more expensive. Desirably the pH of the emulsion is from about 7 to 9, although higher pH's can be used but unnecessarily involve the consumption of more ammonia or the like. Generally, this requires from about 3 to about 10 percent of ammonium hydroxide, based upon binder solids.

Optional ingredients for the binder composition include a silicone release agent and anti-foam compounds. The preferred release agent is Si–55, obtained from the General Electric Company. However, other conventional release agents can be used. The release agent's function is to prevent buildup of the resin on the oven conveyor and associated apparatus carrying the glass fiber mat. When used, the release agent is desirably present in amounts ranging from about ⅕ to about 4 percent.

The antifoam agent is added as needed during the preparation of the binder. The preferred antifoam agent is obtained under the trade name Anti-Foam Q, and is preferably added as a mixture of 10 parts Anti-Foam Q in 90 parts toluene. Any of the conventional antifoam agents can be used instead of Anti-Foam Q.

Other adjuvants such as various fillers can be used if desired, but they are not essential for the binder to be effective.

Desirably, the binder composition is applied to the glass fibers in such a way that the binder comprises from about 8½ percent to about 11½ percent of the glass fiber mat product. The binder preferably constitutes about 9 percent to 11 percent of the mat product on a dry weight basis. At least about 8½ percent of binder is required for adequate bonding of the glass or other fibers so that the mat has structural integrity.

Preferred saturating resins for use in the production of laminates are thermosetting. The best electrical properties with mats having the size-binder system according to the invention have been achieved with epoxy, silicone, melamine and phenolic saturating resins.

Glass fiber laminates produced in accordance with the method of the invention exhibit excellent electrical properties and a softer and more flexible hand is achieved by comparison with mats produced in accordance with the prior art.

It will be apparent that various changes and modifications can be made from the details of the invention as disclosed herein without departing from the scope and spirit of the attached claims.

What I claim is:

1. In a method for producing glass fiber mats which comprises the steps of attenuating streams of molten glass issuing from a multiorifice bushing into fibers, applying a size to the glass fibers, gathering the fibers into strands, projecting the strands onto a moving conveyor to form a porous mat of intermeshed glass fiber strands, applying a resinous binder to the mat, and curing the binder, the improvement of using as the binder an aqueous emulsion consisting essentially of, on a dry basis, from about 28 to 92 percent of an epoxy resin selected from the group consisting of diglycidyl ethers of bisphenol-A and its homologs, glycidyl ethers of glycerol, glycidyl ethers of bisphenol-F, glycidyl ethers of tetrakis (hydroxyphenyl) ethane, peracid epoxies and epoxylated novolacs, from about 7 to 42 percent of an esterifying acid selected from the group consisting of trimer acids, dimer acids, and fatty acids having a chain length ranging from about 8 to 20 carbon atoms, from about 1 to 10 percent by weight of a curing agent for said epoxy resin which volatilizes below the curing temperature of the epoxy resin, from about ⅕ to 10 percent by weight of silane bonding aid, and from about 3 to 65 percent of a solvent for said epoxy having a boiling point between about 150° F. and 375° F., said binder having a pH ranging from about 7 to 9.

2. In the process of producing glass fiber mats as claimed in claim 1 the improvement wherein said binder consists essentially of an aqueous emulsion containing, on a dry basis, from about 28 percent to 92 percent by weight of an epoxy resin produced by the condensation of epichlorohydrin and bisphenol-A having a viscosity from 3600 to 6400 centipoises at 25° C., an epoxide equivalent of from 173 to 179 and having a Gardner color of 1, from about 7 to 42 percent by weight of a dimer acid formed by the polymerization of unsaturated $C_{18}$ acids, from about 1 to 10 percent by weight of triethylene tetramine, from ⅕ to 10 percent by weight of N-beta-(aminoethyl)-gamma-aminopropyltrimethoxysilane, from about 3 to 65 percent of di-isobutyl ketone, and from about ⅕ to 4 percent of a silicone release agent.

3. In the process of producing glass fiber mats as claimed in claim 1, the improvement wherein said size comprises an aqueous solution containing, on a dry solids basis, 49 percent 3,5-dimethyl-1-hexyn-3-ol, 2 percent iso-octyl-phenoxy-polyoxy ethylene ethanol, 49 percent of N-beta - (aminoethyl)-gamma-aminopropyltrimethoxysilane, and said binder consists essentially of an aqueous emulsion containing, on a dry basis, 46 percent of an epoxy resin produced by the condensation of epichlorohydrin and bisphenol-A and having a viscosity of from 3600 to 6400 centipoises at 25° C. and a Gardner color of about 1, 16 percent of a dimer acid produced by the polymerization of unsaturated $C_{18}$ fatty acids, 3 percent triethylene tetramine, 28 percent di-isobutyl ketone, 3/10 percent of a release agent, 7/10 percent N-beta-(aminoethyl)-gamma-aminopropyltrimethoxysilane and 6 percent ammonia, and wherein said binder is applied to said mat in an amount such that the binder comprises from 8½ to 11½ percent of the mat product.

4. A glass fiber mat produced by the method of claim 3.

5. In a glass fiber mat comprising a porous mass of intermeshed glass fibers bonded together at their points of contact, the improvement of a size-binder system comprising an aqueous size composition comprising, on a dry basis, from 20 percent to 98 percent of 3,5-dimethyl-1-hexyn-3-ol, from ½ percent to 40 percent of iso-octyl-phenoxy-polyoxyethylene ethanol, and from 1 percent to 75 percent of an aminoalkylsilane; and a binder composition consisting essentially of an aqueous emulsion containing, on a dry basis, from about 28 to 92 percent of an epoxy resin selected from the group consisting of diglycidyl ethers of bisphenol-A and its homologs, glycidyl ethers of glycerol, glycidyl ethers of bisphenol-F, glycidyl ethers of tetrakis (hydroxyphenyl) ethane, peracid epoxies and epoxylated novolacs, from about 7 to 42 percent of an esterifying acid selected from the group consisting of trimer acids, dimer acids, and fatty acids having a chain length ranging from about 8 to 20 carbon atoms, from about 1 to 10 percent by weight of a curing agent for said epoxy resin having a boiling point between about 150° F. and about 550° F., from about ⅕ to 10 percent by weight of an aminoalkylsilane compound, and from about 3 to 65 percent of a solvent for said epoxy having a boiling point between about 150° F. and 375° F., said binder having a pH ranging from about 7 to 9.

6. The glass fiber mat of claim 5 wherein said size composition comprises an aqueous solution, on a dry basis, of 49 percent of 3,5-dimethyl-1-hexyn-3-ol, 2 percent of iso-octyl-phenoxy-polyoxyethylene ethanol, 49 percent of N-beta - (aminoethyl) - gamma - aminopropyltrimethoxysilane, and said binder consists essentially of an aqueous emulsion of, on a dry basis, 46 percent of an epoxy resin produced by the condensation of epichlorohydrin and bisphenol-A and having a viscosity of from 3600 to 6400 centipoises at 25° C. and a Gardner color of about 1, 16 percent of a dimer acid produced by the polymerization of unsaturated $C_{18}$ fatty acids, 3 percent triethylene tetramine, 28 percent di-isobutyl ketone, 3/10 percent of a release agent, 7/10 percent N-beta-(aminoethyl)-gamma-aminopropyltrimethoxysilane and 6 percent ammonia, and wherein said binder is applied to said mat in an amount sufficient that the binder comprises from 8½ to 11½ percent of the mat product.

7. A laminated product comprising superposed layers of resin saturated glass fiber mat produced by the method of claim 1, and compressed into a dense, solid structure.

8. A binder composition consisting essentially of, on a dry basis, an aqueous emulsion of from about 28 to 92 percent of an epoxy resin selected from the group consisting of diglycidyl ethers of bisphenol-A and its homologs, glycidyl ethers of glycerol, glycidyl ethers of bisphenol-F, glycidyl ethers of tetrakis (hydroxyphenyl) ethane, peracid epoxies and epoxylated novolacs, from about 7 to 42 percent by weight of an esterifying acid selected from the group consisting of trimer acids, dimer acids, and fatty acids having a chain length ranging from about 8 to 20 carbon atoms, from about 1 to 10 percent by weight of a curing agent for said epoxy resin having a boiling point between about 150° F. and about 550° F., from about ⅕ to 10 percent by weight of an aminoalkylsilane, and from about 3 to 65 percent of a solvent for said epoxy having a boiling point between about 150° F. and 375° F., said binder having a pH ranging from about 7 to 9.

References Cited

UNITED STATES PATENTS

| | | | |
|---|---|---|---|
| 2,736,676 | 2/1956 | Frickert, Jr. | 161—72 |
| 2,970,983 | 2/1961 | Newey | 260—47 |
| 3,168,488 | 2/1965 | Sommer | 260—18 |
| 3,318,746 | 5/1967 | Langlois | 161—170X |
| 3,369,926 | 2/1968 | Eakins | 117—126X |
| 3,394,046 | 7/1968 | Smock et al. | 161—170 |
| 3,429,760 | 2/1969 | Roskos et al. | 117—126X |

HAROLD ANSHER, Primary Examiner

D. J. FRITSCH, Assistant Examiner

U.S. Cl. X.R.

117—126; 156—330; 161—156, 157, 170, 185, 193; 260—18, 29.2